N. Aubin,
Piston Meter.
N° 35,806.  Patented July 8, 1862.
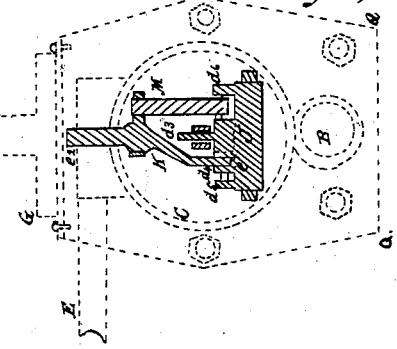
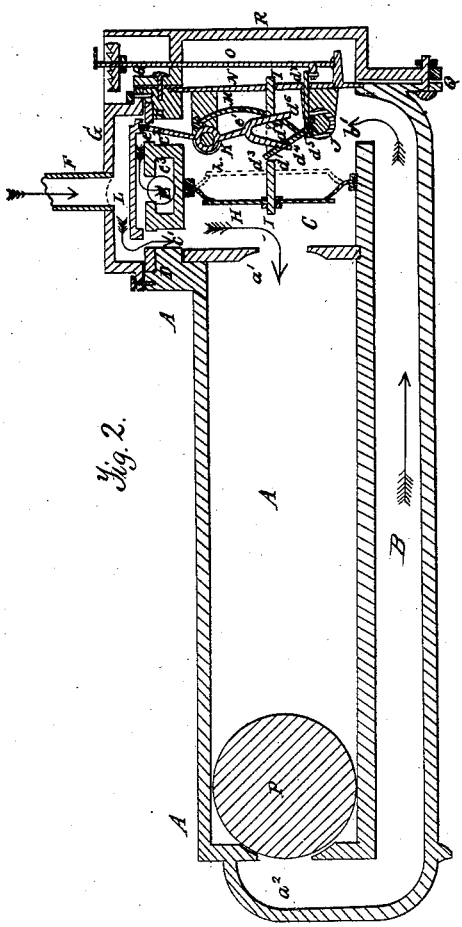
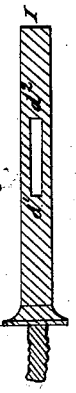
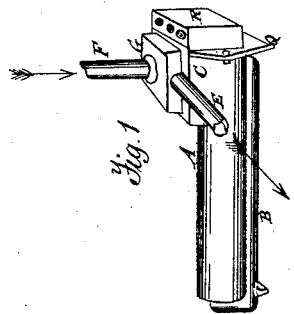
Witnesses.
H. Britton
Enc. de Roy.
Inventor.
N. Aubin

UNITED STATES PATENT OFFICE.

N. AUBIN, OF ALBANY, NEW YORK.

IMPROVEMENT IN FLUID-METERS.

Specification forming part of Letters Patent No. 35,806, dated July 8, 1862.

*To all whom it may concern:*

Be it known that I, N. AUBIN, of the city of Albany, in the State of New York, at present sojourning in Canada, have invented a new and useful Fluid-Meter; and I do hereby declare that the following, taken in connection with the drawings, is a full, clear, and exact description thereof.

In the drawings, Figure 1 is a perspective view of the outside of the meter on a small scale. Fig. 2 is a longitudinal vertical section through the meter on a larger scale. Fig. 3 is a plan of the valve-seat, taken from the lower side, with the valve shown in dotted lines. Fig. 4 is an end view of the meter shown in dotted lines, showing in colors, partly in section and partly in elevation, parts of the valve-working apparatus; and Fig. 5 is a plan on a large scale of the spring-plate rod.

My meter was invented under the determination to produce one that should be cheap, reliable, and acting with but little friction, and therefore capable of working under a small head or pressure of water; and the controlling or leading new idea in my meter is measuring the quantity of water delivered by the motions in a cylinder of a ball, not necessarily packed tight to the sides of the cylinder and of nearly the same specific gravity as water, said ball acting to close apertures at the end of the cylinder, and when so closing them causing the pressure due to the head to act upon and move a valve or valves so that the ball may commence to re-traverse the path it has already passed over, but in an opposite direction. The cylinder may be replaced by a box with a square or polygonal triangular or elliptical section, and the ball may be of various shapes other than spherical, so long as it is shaped in such manner as to perform its functions, and it need not of necessity be of the same specific gravity as water, although it is preferable so to make it.

The drawings exemplify my invention in a working and practical form, and I have devised others which embody the same principles.

I prefer to make the ball of vulcanized rubber or gutta-percha so hollowed as to be of the same specific gravity as water, but intend also to make it of any proper material, such as metal, or of heavy wood, covered with leather, or of wood only, and when the ball is not made of or covered with leather or india-rubber I prefer to make the seats against which it strikes of india-rubber or leather.

In the drawings, the ball P is supposed to be made of vulcanized or other india-rubber, and it is made to fit loosely in a cylinder, A. This cylinder has two ends with apertures therein, $a'$ $a^2$, and is provided with a side pipe, B. The ball when at either end acts as a valve, closing the aperture.

At one end of the cylinder is a chamber, C, on top of which is a valve-seat, D D, provided with three ports, $c'$ $c^2$ $c^3$. One of these ports connects with the delivery-pipe to the house, factory, &c., at E, and the other two connect with the chamber and the valve-chest G, into which leads the pipe F, connecting with a water-main. The side pipe connects with the bottom of the chamber by an aperture, $b'$, and the orifice $a'$ connects directly with the chamber. Upon the valve-seat slides an ordinary short slide-valve, L, and I prefer, for a reason hereinafter stated, to make this valve with but little lap, although it may be made with the ordinary lap for such valves.

Within the chamber C is a spring-plate, H, making a partition across it and separating the aperture $b'$ from the orifice $a'$. This plate must be secured at its edges by flanges on the chamber, or otherwise, so as to make a tight partition, but still one that may be bulged out in one direction or the other. I prefer to make it of copper or bronze, corrugated like the top of an aneroid barometer; but it may be of any other metal, corrugated or plain; but in the latter case its edges ought to fit within a groove so as to have a little motion; but the partition may also be a diaphragm, of leather, india-rubber, or other suitable material, with a central plate bolted or otherwise affixed to it. To this spring-plate or diaphragm is attached a rod, I, slotted, or with two pins projecting from it, so as to constitute two shoulders, $d'$ $d^2$. This rod should be guided so that when the spring-plate moves it shall travel in straight lines, or nearly so. Lying between these shoulders is an arm, $d^3$, which is attached to a rocking shaft, J, supported on any proper bearings. This same shaft has also attached to it three short arms, $d^4$, $d^5$, and $d^6$. The arm $d^4$ lies within a fork, making part of a lever, K, pivoted somewhere about its center, and this lever extends upward and enters a cavity on the valve L, passing through one of the ports. The arm $d^6$ supports a pin, (see Fig. 4,) to which is fastened or upon which rests a spring, M, this spring being secured at its upper end.

The spring with its pin and arm are so arranged that the spring shall be compressed by any motion imparted to the shaft until the arm $d^3$ is vertical, and that it shall after that expand and exert its force in throwing the rock-shaft either to the right or to the left, as the case may be. This arrangement of spring is common in sash-locks, and the spring shown in the drawings may be replaced by one of any other form, acted upon by and producing similar effects upon the shaft, or a tumbling-bob—such as is used to reverse motion in metal-planing machines—may be substituted for the spring. The pivots of the rock-shaft and the lever K may be supported by a piece of metal, N, which may or may not form one side of the chamber. In case it does not the chamber is to be closed by a cap, R.

The short arm $d^5$ actuates a rod, $d^6$, vibrating it at each stroke of the rock-shaft, and these vibrations are to actuate in any proper or usual manner a counter or register of any suitable or ordinary construction, which shall register the vibrations of the rock-shaft, and consequently the amount of water or other fluid delivered through the meter.

The action is as follows: Water entering through the main into the valve-chest flows through port $c'$ and through orifice $a'$ into the cylinder and moves the ball along, (all parts except the ball being in position, as shown in the drawings.) As the ball moves, water flows out through orifice $a^2$, through side pipe, B, through aperture $b'$, through the chamber, through port $c^2$, under and through the valve-cup, and out through the delivery E. When the ball P arrives at the end of the cylinder, it closes the orifice $a^2$. The head or pressure then acts upon the spring-plate, shoving it over toward the position shown by dotted lines. As it moves, the rod I moves and carries the arm $d^3$ and its rock-shaft, compressing the spring. When the short arm $d^6$ arrives at the vertical and passes it a little, the spring expands, throwing the rock-shaft suddenly over, and as it turns the arm $d^4$ acts on the forks of the lever K, and the upper end of the latter reverses the valve. Water then enters through $c^2$, through $b'$, through the side pipe and orifice $a^3$, and the ball commences to float along toward $a'$, delivering the water contained in the chamber that it traverses. When the ball arrives at $a'$, the spring-plate, with all its connections, and the valve will traverse over again to the positions shown in the drawings, the spring-plate being moved by the pressure of water, made effective by the stopping of the orifice $a'$.

In place of the ball traveling in the cylinder, a diaphragm secured at its edges at or about the center of the length of the cylinder may be employed. This diaphragm, when the valve is reversed from one position to the other, will reciprocate in the cylinder, bulging out alternately on opposite sides, and, when bulged or bellied out to the fullest extent its construction will permit, will check the flow of water into the cylinder, such check being due to the fact that the diaphragm is packed or secured at its edges, and can distend no farther without rupture. When the flow of water is thus checked, its head or pressure will become effective and operate upon the spring-plate, and the latter, acting through its connections, will move the valve. When the valve is reversed, water will flow out from the side of the diaphragm that is at that instant concave and enter upon the side that is convex, and so continue until the convex side has become concaved and the diaphragm reached its limit of motion, and then the head will become effective again and the valve will be again reversed. A long slide, or piston, or puppet, or other valves may be substituted for the short slide shown on the drawings, so long as they have the mode of operation of the valve specially described to open and close ports connecting with different sides of the ball, and I prefer, as before stated, to make a short slide with little lap, so that there will be a leakage while the valve is moving from one position to the other, thus practically preventing a complete stoppage of the flow of water and consequent injury to the pipes. This leakage will be pretty nearly constant at each throw of the valve and may be allowed for. The spring and the acting force upon it and the area of the valve, if unbalanced, (although balanced valves may be used,) must have certain proportions, although such proportions need not be very definite, the rule being that the spring-plate must be able to compress the spring, and the latter, when expanding, must have force enough to move the valve.

The function of the ball is to move with the current of water in the chamber and to stop the orifices. The function of the spring-plate is to move when the orifices are closed, being actuated by the head or pressure of water, and its function while moving is to compress the spring or lift a weight, and the duty of the spring is to expand after being compressed and move the valve.

I call the spring-plate or diaphragm, and the spring or its equivalent, and the connections causing it to actuate the valve, a "reversing apparatus," and this apparatus may be variously modified so long as its parts perform their proper duties, acting under a mode of operation substantially as described.

I claim as of my own invention—

A reversing apparatus and valve or valves, constructed and acting under a mode of operation substantially as described, in combination with a cylinder or its equivalent in which the flow of water is checked or caused to cease by the stoppage of motion of a ball or its equivalent for the purpose, acting substantially in the manner and for the purpose specified.

In testimony whereof I have hereunto subscribed my name.

N. AUBIN.

In presence of—
   A. AUBIN,
   ENC DE ROY.